(12) United States Patent
Yamamoto et al.

(10) Patent No.: US 9,946,653 B2
(45) Date of Patent: Apr. 17, 2018

(54) PREDICTIVE MEMORY CACHING (71) Applicant: NCR Corporation, Duluth, GA (US)

(72) Inventors: Isamu Yamamoto, Belmont, CA (US);
Lakshmanan Chinnaveerappan,
Sunnyvale, CA (US); Eric K. J. Wang,
Sunnyvale, CA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/142,054

(22) Filed: Apr. 29, 2016

(65) Prior Publication Data
US 2017/0315917 A1 Nov. 2, 2017

(51) Int. Cl.
G06F 12/08 (2016.01)
G06F 12/0862 (2016.01)
G06N 99/00 (2010.01)
H04L 29/08 (2006.01)
G06F 12/0866 (2016.01)

(52) U.S. Cl.
CPC ...... *G06F 12/0862* (2013.01); *G06F 12/0866* (2013.01); *G06N 99/005* (2013.01); *H04L 67/14* (2013.01)

(58) Field of Classification Search
CPC .......................... G06F 12/0862; G06F 12/0866
USPC .................................................. 711/118, 113
See application file for complete search history.

(56) References Cited

U.S. PATENT DOCUMENTS

| | | | | |
|---|---|---|---|---|
| 2004/0088155 A1* | 5/2004 | Kerr | ...................... | G06F 17/211 704/8 |
| 2013/0232215 A1* | 9/2013 | Gupta | ..................... | G06F 3/061 709/213 |
| 2014/0011538 A1* | 1/2014 | Mulcahy | ............. | H04L 67/2842 455/553.1 |
| 2015/0026413 A1* | 1/2015 | Meier | ................. | G06F 12/0862 711/137 |
| 2016/0239433 A1* | 8/2016 | Frachtenberg | ........ | G06F 12/121 |

\* cited by examiner

*Primary Examiner* — Than Nguyen (74) *Attorney, Agent, or Firm* — Schwegman Lundberg & Woessner (57) ABSTRACT

Metadata history is collected for operations performed by an application as directed by a user. In a subsequent interaction by the user with the application, interaction metadata for the interaction is matched to a pattern in the metadata history. An operation identified in the pattern is processed as a background process and results from processing the operation are pre-staged in cache of the device being operated by the user. When the user requests the operation during the subsequent interaction with the application, the pre-staged results from the cache are provided to the user.

17 Claims, 4 Drawing Sheets

PREDICTIVE MEMORY CACHING

BACKGROUND

Today, users perform a variety of actions through processor-enabled devices over a variety of network connections (wired and/or wireless). In fact, users now rely on mobile devices having WiFi or cellular connections to the Internet for a variety of tasks, such as navigation directions, searching for information, interacting and performing operations with an enterprise-specific mobile application that interfaces through the wireless network connection to a backend enterprise system.

Although processor speed, the size of available memory, and storage have significantly been improved in recent years for phones, a typical user still experiences noticeable lags in response times from his/her phone in response to a requested task because often the user is running a variety of applications in the background on the processor of the phone for which the user is completely aware of.

For example, some tasks may be required by the Operating System (OS) of the phone; some tasks, the user failed to properly configure the settings for and as a result are initiated and executed on the phone when the phone is powered off and on or when the phone is booted; some tasks, the user manually initiated on the phone and then moved on to a different task without manually terminating the originally initiated tasks; and some tasks the user is presently interacting with and wants those tasks to be executing on the phone.

In addition, everyone has experienced less than optimal cell phone or WiFi service (either because of bandwidth issues of because of weak wireless signals and connections). This also reduces user's response times to tasks, especially since many tasks executed on the phone are relying on communications between the phone and a network device's service.

Users are almost incessantly using their phones for performing a variety of device-only tasks and enterprise-specific tasks over wireless connections. Furthermore, the enterprise-specific tasks are repetitively performed by the users with varying degrees of frequency.

Caching permits processor-enabled devices to: improve processor throughput, reduce Input/Output (I/O) storage load, and improve response times of operations (thereby improving user response time). However, existing caching techniques, by and large, are focused on retaining most frequently accessed data from storage in cache and retaining more recently accessed data from storage in cache for some limited period of time.

However, these existing caching techniques are application and user-behavioral agnostic; meaning the techniques are performed based on a current state of the device and current usage of the device and with respect to just those applications that are actually executing on the device.

Therefore, there is a need for improved caching techniques, which more intelligently provide caching services for a device based on behaviors of the user with respect to specific applications that execute on the device so that: processing throughput on the device improves, loading of storage for the device improves, and application responsiveness to interactions with the user improves.

SUMMARY

In various embodiments, methods and a device for predictive memory caching are presented.

According to an embodiment, a method for predictive memory caching is provided. Specifically, in an embodiment, metadata is collected for an interaction with an application. The metadata is matched with a pattern in metadata history for previous interactions with the application. The operation identified in the pattern is executed to obtain a result. Finally, a cache is prepopulated with the result in advance of the interaction requesting that the operation be processed by the application.

DETAILED DESCRIPTION

Figure 1:
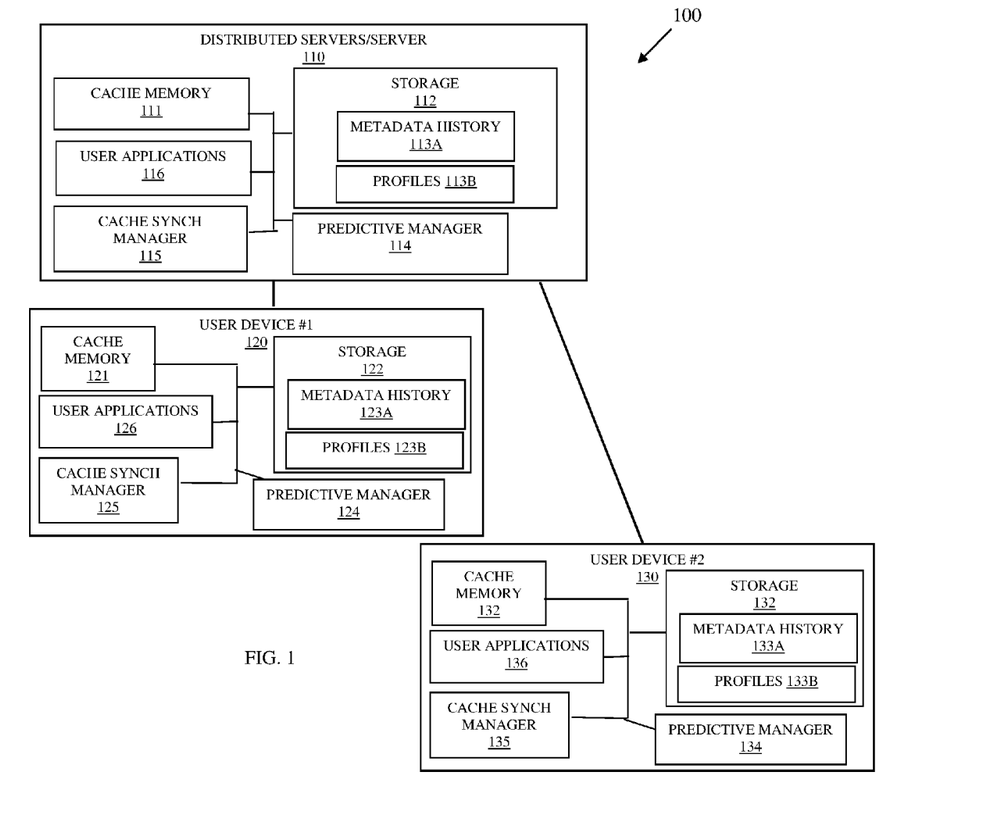
FIG. 1 is a diagram of a system for predictive memory caching, according to an example embodiment.

FIG. 1 is a diagram of a system 100 for predictive memory caching, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the predictive memory caching processing techniques presented herein and below.

Moreover, various components are illustrated as one or more software modules, which residing in non-transitory storage and/or hardware memory as executable instructions that when executed by one or more hardware processors of a hardware device perform the processing discussed herein and below.

The techniques, methods, and device presented herein and below for predictive memory caching can be implemented in all, or some combination of the components shown in different hardware computing devices having one or more hardware processors.

The system 100 includes one or more distributed servers/server 110, a first user operated device 120 (hereinafter referred to as device #1 120"), and, optionally, a second user operated device 130 (hereinafter referred to as device #2 130"). It is to be noted that device #1 120 is a different hardware device from that which is associated with device #2 130.

The system 100 can operating in a variety of modes, each mode will be presented below separately.

First Mode of Operation for the System 100

The distributed servers/server 110 can include a collection of servers that act as a single logical server and provide distributed caching services for a plurality of user devices over network connections. Alternatively, the distributed servers/server 110 can includes a single server providing caching services for a plurality of user devices over network connections. Hereinafter, the distributed servers/server 110 is referred to as just "server 110;" although it noted that any usage of "server 110" is intended to include embodiments where the server 110 is a distributed set of servers (distributed servers) or where the server 110 is just a single network based server.

The sever 110 includes cache memory 111 (hereinafter referred to as "cache 110"), non-transitory computer-readable storage 112 having metadata history 113 (described herein and below in greater detail), a predictive manager 114, a cache synch manager 115, and a variety of user applications 116 (which support interaction with user-initiated requests over a network connection from applications 126 and/or 136 executing on device #1 120 and/or device #2).

The predictive manager 114 is a set of executable instructions that is executed from memory and/or the storage 112 by one or more hardware processors of the server 110 for providing a variety of novel processing capabilities for predictive user-behavioral based caching with respect to the user applications 116, 126, and/or 136.

During execution, the predictive manager 114 dynamically maintains, manages, tracks, monitors, and updates metadata history 113 for a specific user (based on a unique user identifier for the user). The metadata history 113 includes for each unique user a variety of information. The information is organized into records or uniquely discernable units of information (herein after just "record").

In an embodiment, each record is based on a user's particular interactions with a particular user application 116, 126, and/or 136 during a session with that application 116, 126, and/or 136.

In an embodiment, each record is based on user's particular interactions with any of the user applications 116, 126, and/or 136 during a session with the server 110.

The information contained in each record includes data representing, by way of example and not by way of any limitation, some or all of the following: a user identifier, a session identifier (specific to the server 110 and/or specific to an application 116, 126, and/or 136, a session start time (which includes a calendar date, a day of week, and time of day), a device identifier device #1 120 and/or device #2 130 from which the session is initiated, a physical location of the device #1 120 and/or device #2 130 when the session was initiated (the physical location may be represented as a zip code, address, and/or longitude and latitude coordinate), an altitude value for any available altitude of the device #1 120 and/or device #2 130 associated with the device identifier when the session was initiated (can be obtained from the device #1 120 and/or device #3 or can be resolved based on a none altitude for the physical location, and a plurality of sub-information relevant to the session activity for the session assigned to the session identifier.

The sub-information includes data, representing, by way of example and not way of any limitation, some or all of the following: an application identifier for a particular one of the user applications 116, 126, and/or 136, and an operation identifier for operation performed by the application 116, 126, and/or 136 (it is noted that the application identifier and operation identifier may be combined as a single identifier representing both the application identifier and the operation identifier).

The predictive manager 114 parses and processes the metadata history 113A to identify patterns of user activity (behavior) for each particular user application 116, 126, and/or 136. For example, on a given day of a month, the metadata history 113A shows that the user establishes a session from device #1 120 from the user's home to the user's server-based banking application 116 and performs a check account balance operation and performs a service of other operations to pay a recurring monthly electric bill. This identified pattern is stored in a profile 113B for the user based on the user identifier.

The user profile 133B may be organized into sub-profiles having patterns for: each application 116, 126, and/or 136 that has been accessed by the user; specific calendar dates and/or specific days of week that the user has accessed one or more of the applications 116, 126, and/or 136 (such patterns this may be referred to herein as a "user's schedule"); each device #1 120 and/or device #2 130 that the user has accessed one or more applications 116, 126, and/or 136, specific locations that the user has accessed one or more of the applications 116, 126, and/or 136. The user profile 113B may also be additionally organized into combinations of the sub-profiles having patterns for various of the sub-profiles combined as a combination sub-profile (such as a specific calendar date and location pattern combinations; specific user applications 116, 126, and/or 136 pattern combinations, specific device 120 and/or 130 and/or user application 116, 126, and/or 136 pattern combinations; etc.).

The metadata history 113A is dynamically maintained to retain all user activity with respect to any user session, device access, and application access by the predictive manager 114. Moreover, the predictive manager 114 uses each session established by the user from the devices 120 and/or 130 and its concluding metadata record for purposes of re-evaluating the patterns in the user's profile 113B and updates, adds, or removes patterns based on the concluding metadata record. Thus, the predictive manager 114 is dynamically learning behaviors of activity of the user with these learned behaviors recorded in the dynamically and continually updated patterns of the user's profile.

When a user then establishes a session from one of the devices 120 and/or 130 after a successful logon for access to the server 110, the predictive manager 114 processes information available with and obtained from the established session, such as: user identifier, calendar day, day of week, time of day, device identifier, location of the device associated with the device identifier, altitude of the device, and/or application identifier (when the user is directly logging in through a specific user application 116).

Next, the predictive manager 114 formulates a search or score associated with the obtained session information for the user login session. This can be a weighted score that weights each of the component pieces of the session information. This is compared against the patterns in the user's profile 113B to receive a partial or full match in the case of the query and a value computed from subtracting the weighted score for the component pieces of the session information from scores assigned to the patterns of the user's profile 113B. The resulting partial match or computed value is then compared against a predefined threshold value and assuming comparison is within a predefined range of the threshold value, an existing pattern of activity for the user can be selected by the predictive manager 114 as a prediction as to what application(s) 116, 126, and/or 136 the user is likely to access during the session and as a prediction as to what operations (and even order of those operations) that the user is likely to initiate while accessing the application(s) 116, 126, and/or 136 during the session.

In advance of the user actually accessing the predicted applications 116, 126, and/or 136 and/or the predicted operations (and order of those operations), the predictive manager 114 initiates those applications 116, 126, and/or 136 as a background process to the user's session and/or performs the operations (in the order of those operations identified from the matched pattern(s) from the user's profile 113B) and pre-populates the cache memory 111 with the data associated with the results of executing the operations.

Thus, when the user actually performs one of the predictive operations, the results of those operations are already available in the cache memory 111 for access by the corresponding application 116, 126, and/136 for delivery to the user on the user's device 120 and/or 130. This reduces the load experienced by I/O requests from the storage 112, improves processing throughput of the processor(s) of the server 110, and improves response times experienced by the user when requesting an operation from an application 116, 126, and/or 136 because in advance of even a user request for the operation, the results of the operation are available for delivery to the user from the cache memory 111 (which is faster than accessing storage 112 and which is faster response to the user because the operation is done before the user even actually requests that operation).

In an embodiment, the predictive manager 113 cooperates with an Operating System (OS) background process and/or one of the user applications 126 and/or 136 (as a background process) of the device 120 and/or 130) for streaming the pre-staged results from processing the anticipated operation directly to the cache memory 121 and/or 131 of the device 120 and/or 130, such that the results are available locally on the user's device 120 and/or 130 in advance of an actual request by the user for the operation.

Thus, not only may the anticipated operation be processed on behalf of a user (based on that user's profile 113B and the user's session metadata 113A) with the pre-staged results populated in cache 111 of the server 110 but the pre-staged results can also be streamed as a background process to locally populate the pre-staged results to the cache 121 and/or 131 of the device 120 and/or 130 being operated by the user.

Second Mode of Operation for the System 100

For this description of the second mode of operation, only one of the user devices (device #1) is discussed in the description that follows. However, it is noted that this mode can apply equally for each of the user devices 120 and/or 130 having the configuration as shown in the FIG. 1.

The device #1 120 includes cache memory 121, storage 122 (having metadata history 123A and profiles 123B), a predictive manager 124, a cache synch manager 125, and user applications 126.

The metadata history 123A includes all the components discussed above with the first mode of operation for the system 100. However, in an embodiment, where the device #1 120 is only operated by a single user (such as when device #1 120 is a mobile phone), it may not be necessary to retail a user identifier for the user with the metadata history 123A.

Similarly, the profiles 123B includes all the components discussed above with the first mode of operation for the system 100.

In some embodiments, the session identifier for sessions used in the metadata history 123A may also represent an interaction from initiation to termination that the user has with a user application 126 involving no network connection, such that the interaction between the user and the user application 126 is wholly contained on the device #1 120.

In other cases, the session identifier for sessions used in metadata history 123A may represent a session created over a network connection from a user application 126 initiated for execution on the device #1 120 by the user, where the user application 126 creates the network connection and session with a particular backend service or user application 116 of the server 110 during the course of its processing. Such connection, may or may not require affirmative input from the user interacting with user application 126 for authenticating and logging into the server 110 and/or user application 116. For example, the user's login information (user identifier and credentials (password, token, etc.) may be saved by user application 126 and automatically provided to user application 116 when the user initiates user application 126 for execution on device #1 120 (such that the user need not provide any affirmative login information for user application 116 to establish the session with user application 116). In another case, an interface of user application 126 may require affirmative login information to be provided by the user for establishing the session between user application 126 and user application 116.

The predictive manager 124 performs the same anticipatory operation execution in advance of a user request as was discussed above with the first mode of operation for the system 100. However, such anticipatory operation execution may be entirely performed on device #1, such as when no network connection is needed to user application 116 to obtain the pre-staged results from executing the anticipated operation and to populate those pre-staged results in cache 121 of device #1 120 in advance of the user requesting the operation (during the course of the user interacting with user application 126). In other cases, the predictive manager 124 may need cooperation of user application 116 for executing the anticipated operation for obtaining the pre-staged results (this occurs when there is a session between device #1 120 and the server 110.

Third Mode of Operation for the System 100

In this mode of operation, device #1 operating in a second mode of operation (at least initially) includes a cache synch manager 125. The cache synch manager 125 is configured in a variety of manners to communicate the user's metadata history 123A and profile 123B over a network connection to the cache synch manager 115 of the server 110.

The communication of the metadata history 123A and the profile 123B can occur based on a variety of events detected by the cache synch manager 125. Such as an event based on detection of a session termination request (one initiated by the user on device #1 120), an event based on a preconfigured time interval, a request event generated by the cache synch manager 115 of server 110 (through an Application Programming Interface (API) call), a request event generated by cache synch manager 135 of device #2 to cache synch manager 115 of server 110 and from cache synch manager 115 of server 110 to cache synch manager 125 of device #1 120, and/or a synch request event generated by a user through an interface to one of the user applications 136 for the metadata history 123A and profile 123B of device #1 to be synched on device #2 130 and processed through cache synch manager 115 of the server 110.

The cache synch managers 115, 125, and 135 cooperate to periodically and automatically synch the metadata 113A, 123A, and 133A and synch the profiles 113B, 123B, and 133B between server 110, device #1 120, and device #2 130.

So, one beneficial aspect of this synchronization is that a user operating a phone as device #1 and a laptop as device #2 can have the learned and dynamic anticipatory pre-staging of results for operations preprocessed and populated to caches 121 and 131 by the predictive managers 124 and 134 in a consistent manner. The embedded intelligence associated with the dynamically evolving patterns in the profiles 113B, 123B, and 133B can be leveraged and processed in consistent manners by the predictive managers 112, 124, and 134 irrespective of what device (110, 120, or 130) the user accesses a user application 116, 126, or 136 (assuming that a matched pattern for pre-staged results populated to caches 111, 121, and 131 are not dependent on access being from a particular device 110, 120 or 130).

Thus, the user experiences enhanced application response times on a device-specific bases (when device specificity is relevant) and enhanced application response times on a device-independent bases (utilizing the metadata 113A, 123A, and 133A and profile 113B, 123B, and 133B synchronization mode of operation for the system 100 (third mode of operation for the system 100)).

Fourth Mode of Operation for System 100

Some operations for some applications 116, 126, and/or 136 may be critical or sensitive transactions, such as an operation associated with paying a bill online through a financial application for a financial institution, or such as transmittal of private information (sending medical records, social security numbers, credit card numbers, and the like).

In these situations, the first and second modes of operation can include a further aspect to the predictive managers 114, 124, and 134, which presents in an interface to a user operating device 120 and/or 130 confirmation screens. The confirmation screen may describe what the operation or operations are that the predictive managers 114, 124, and 134 are proposing to execute and request confirmation from the user before executing those operation(s).

For example, suppose that predictive manager 124 detects a session for a bank application being initiated by the user on the user's desktop computer while the user is at home and it is the 15$^{th}$ day of April. The session information is identified as a current metadata, which the predictive manager 124 processes upon session authentication to identify a pattern in the profile 113B indicating that the user is expected to pay a utility bill from a checking account online. In this case, the predictive manager 124 immediately presents an interface screen to the user within the context of the executing bank application 126 that states "Do you want to pay your utility bill of X amount to utility company Y from checking account Z?" Upon confirmation through the interface, the predictive manager 124 performs the operation(s) to effectuate the transaction cooperating through background processing with the banking server 110 and the appropriate banking server application 116.

In the above example, a few additional features of the fourth mode of operation are described. Namely, in order for the predictive manager 124 to properly present the interface notification screen, the predictive manager 124 had to pre-cooperate with the banking server application 116 for purposes of identifying the amount X of the bill, the name of company Y, and the checking account Z. This can be done through variables identified in the profile patterns linked to workflow operations provided by banking server application 116. Any type of tag, format, or special character can be configured to be recognized by the predictive manager 124 to identify such variables, the variables themselves can be linked to a table that includes entries for each variable and each entry identifying the API calls (operations) that the predictive manager 124 needs to process with the banking server application 116 for resolving those variables in advance of presenting the interface screen to the user of device #1 120. Other techniques may be used as well to provide workflows of operations that the predictive manager 124 processes for resolving variables before providing confirmatory information screens to the user for critical or sensitive operations that require user approval before being preprocessed.

It is noted that there are non-sensitive operations that the predictive manager 124 can perform while processing the sensitive operations as discussed above. These non-sensitive operations can occur as background processes unbeknownst to the user and may also be associated with a matched pattern. For example, suppose the user in addition to paying the utility bill online also requests a balance of all user accounts with the bank associated with bank server 110. While the predictive manager 120 is performing the workflow of operations with banking server application 116 to resolve the variable values necessary for the notification interface screen, the predictive manager 120 can also interacting with the banking server application 116 for prepopulating and pre-staging the current balances of all user accounts to cache 121. Thus, when the user selects a balance operation in banking application 126, the balances of all accounts are already available for presentation to the user from cache 121.

The fourth mode of operation illustrates that the predictive managers 114, 124, and 134 can: 1) perform workflow operations to automate a user's predictive actions based on behaviors of the user, 2) perform background operations to pre-populate variables that need to be dynamically resolved for operations that require user confirmation, and 3) perform operations that do not require user confirmation concurrently as background processing with performance of 1) and/or 2).

In an embodiment, the predictive manager 114, 124, and 134 can use a machine learning algorithm for developing a matching, weighting, and/or scoring technique for matching session metadata to a particular pattern or set of patterns from the profiles 113B, 123B, and 133B. The algorithm can be dynamically adjusted over time based on actual actions of the user with respect to predictive operations executed by the predictive manager 114, 124, and 134. The actual actions are noted by the predictive manager 114, 124, and 134 and used as feedback into the machine learning algorithm to dynamically adjust the matching, weighting, and/or scoring technique when the actual actions were not what was identified as the predictive operations provided by the predictive manager 114, 124, and 134.

In an embodiment, the predictive manager 114, 124, and 134 is implemented as a wrapper to the respective application 116, 126, and 136, such that inputs from the user are captured by the wrapper and properly recorded in the metadata history 113A, 123A, and 133A. In this manner, the prepopulated and pre-staged results can be provided by the wrapper from the cache 111, 121, and 131 when the user issues a directive/command to the application 116, 126, and 136 and the wrapper ensures that the operation is not processed by the application 116, 126, and 136.

In an embodiment, the wrapper is a transparent and/or forward proxy to its respective application 116, 126, or 136. In the transparent proxy configuration, the reference for accessing the application 116, 126, 136 points to the transparent proxy.

In an embodiment, the wrapper is a forward proxy to its respective application 116, 126, or 136. Here, the application 116, 126, or 136 is modified when receiving a command to forward that command to the forward proxy.

In an embodiment, the application 116, 126, or 136 is unmodified for interaction with its respective predictive manager 114, 124, or 136.

In an embodiment, the application 116, 126, or 136 is modified and enhanced to include the processing of its respective predictive manager 114, 124, or 136.

In an embodiment, the application 116, 126, or 136 interacts with an Operating System (OS) of its device 110, 120, or 130 to register for receiving commands received from and sent to the application 116, 126, or 136.

In an embodiment, the device 120 or 130 is one of: a phone, a wearable processing device, a tablet, a laptop, a Self-Service Terminal (SST), a Point-Of-Sale (POS) terminal, a desktop computer.

These and other embodiments are no discussed with reference to the FIGS. 2-4.

Figure 2:
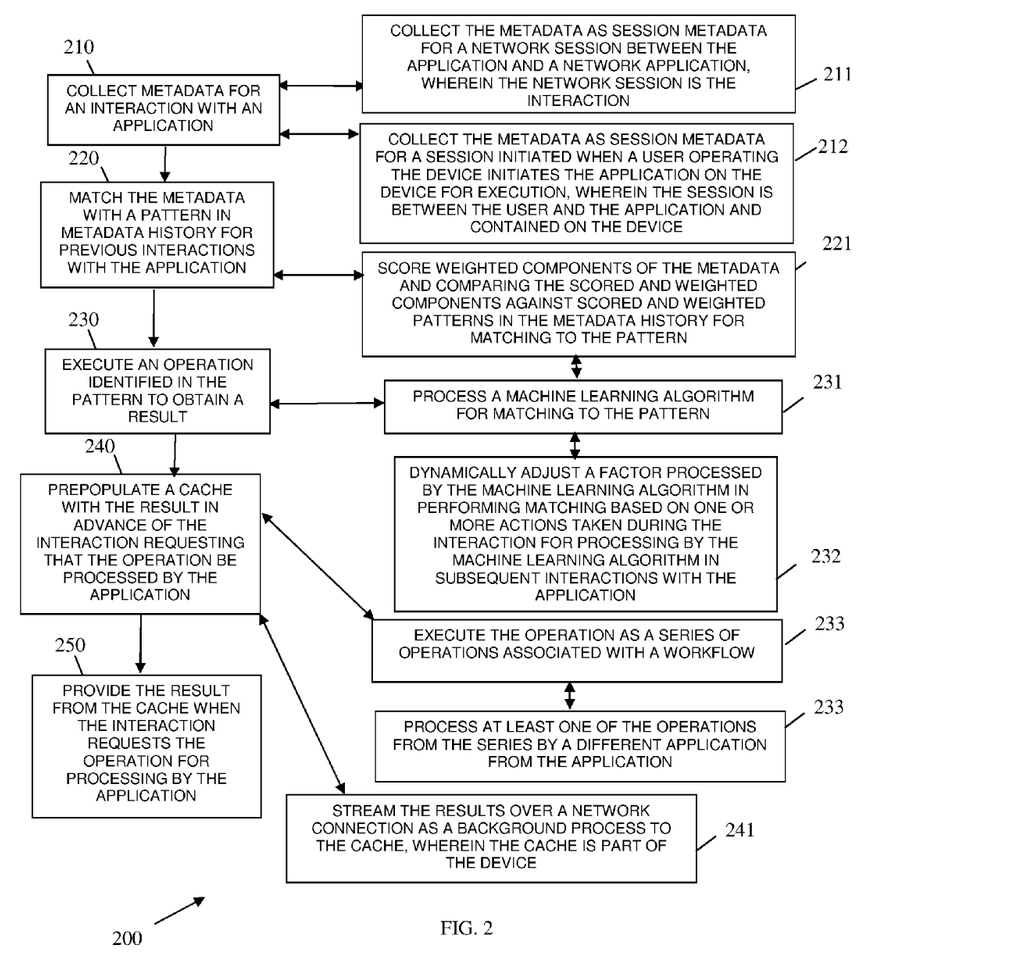
FIG. 2 is a diagram of a method for predictive memory caching, according to an example embodiment.

FIG. 2 is a diagram of a method 20 for predictive memory caching, according to an example embodiment. The software module(s) that implements the method 200 is referred to as a "predictive cache manager." The predictive cache manager is implemented as executable instructions programmed and residing within memory and/or a non-transitory computer-readable (processor-readable) storage medium and executed by one or more hardware processors of a hardware computing device. The processors of the device that executes the predictive cache manager are specifically configured and programmed to process the predictive cache manager. The predictive cache manager may or may not have access to one or more networks during its processing. Any such networks can be wired, wireless, or a combination of wired and wireless.

In an embodiment, the device that executes the predictive cache manager is server 110.

In an embodiment, the device that executes the predictive cache manager is device #1 120 or device #2 130. In an embodiment, device 120 or 130 is one of: a phone, a wearable processing device, a tablet, a laptop, a Self-Service Terminal (SST), a Point-Of-Sale (POS) terminal, and a desktop computer.

In an embodiment, the predictive cache manager is the predictive manager 114, 124, or 134.

At 210, the predictive cache manager collects metadata for an interaction with an application. This can be achieved in a number of manners, such as when the predictive cache manager is one of a: a wrapper to the application, a transparent proxy to the application, a proxy to the application, and/or a registered OS service that receives calls and data sent to and sent from the OS.

In an embodiment, the metadata can be any of the data with a structure similar as discussed above with respect to the discussion of the initial session metadata for initially establishing the interaction (such as when a user initiates the application (user session with the application) or when a different application creates a session for the interaction with the application).

According to an embodiment, the predictive cache manager collects the metadata as session metadata for a network session between the application and a network application. The network session is the interaction. For example, a session (as described above with the FIG. 1) between application 126 and network application 116.

In an embodiment, the predictive cache manager collects the metadata as session metadata for a session initiated when a user operating the device initiates the application on the device for execution. Here, the session is between the user and the application wholly contained on the device. This situation was discussed above with reference to the FIG. 1 and is a situation where the device (device that executes the predictive cache manager) does not require any network connection in performance of the processing of the predictive cache manager.

At 220, the predictive cache manager matches the metadata with a pattern in metadata history for previous interactions with the application. In an embodiment, the metadata history is the metadata history 113A, 123A, or 133A; having the component information and structure discussed above with the FIG. 1.

According to an embodiment, at 221, the predictive cache manager scores and weighted components of the metadata (e.g., initial session metadata (as discussed in the FIG. 1) and, then, the predictive cache manager compares the scored and weighted components against scored and weighted patterns in the metadata history for matching to the pattern.

In an embodiment, at 222, the predictive cache manager processes a machine learning algorithm for matching to the pattern.

In an embodiment of 222 and at 223, the predictive cache manager dynamically adjust a factor processed by the machine learning algorithm in performing the matching based on one or more actions taking during the interaction for processing by the machine learning algorithm in subsequent interactions with the application. For example, suppose an operation in the matched pattern during the interaction is never actually processed by the application when the predictive cache manager predicted that the operation would be processed based on the matched pattern. An indication that the operation was predicted as being needed but not actually processed can be provided back to the machine learning algorithm to adjust the scoring and weighting of the machine learning algorithm, which changes how the machine learning algorithm matches to a pattern in subsequent interactions with the application. This is a dynamic and real time feedback learning process.

At 230, the predictive cache manager executes an operation identified in the pattern to obtain a result. That is, when the operation is processed by the application, a result is produced. The execution of the operation occurs in advance of the interaction actually requesting that the operation be processed. That is, the predictive cache manager predicts that the operation is going to be needed at some point during the interaction based on the metadata, the metadata history, and the matched pattern having the operation.

In an embodiment, at 231, the predictive cache manager executes the operation as a series of workflow operations or tasks associated with a workflow. That is, the operation may be linked to a series of sub-processing tasks (operations) that are identified as being necessary for successfully executing the operation.

In an embodiment of 231 and at 232, the predictive cache manager preprocesses at least one of the operations from the series through a different application from the application.

In an embodiment, at 233, the predictive cache manager executes the operation as a background process on the device that is executing the predictive cache manager.

At 240, the predictive cache manager prepopulates a cache with the result in advance of the interaction (session) actually making a request that the operation be processed by the application.

In an embodiment, at 241, the predictive cache manager streams the results over a network as a background process to the cache, where the cache is part of or resident on the device. Here, the predictive cache manager and the application may be executing on server and the interaction is a session between a user operating the device and the server. This pushes the result to the local cache of the device, such that when the user requests the operation for processing the result is locally available to the interaction and the user from the device that the user is operating.

According to an embodiment, at 250, the predictive cache manager provides the result from the cache when the interaction requests the operation for processing by the application.

Figure 3:
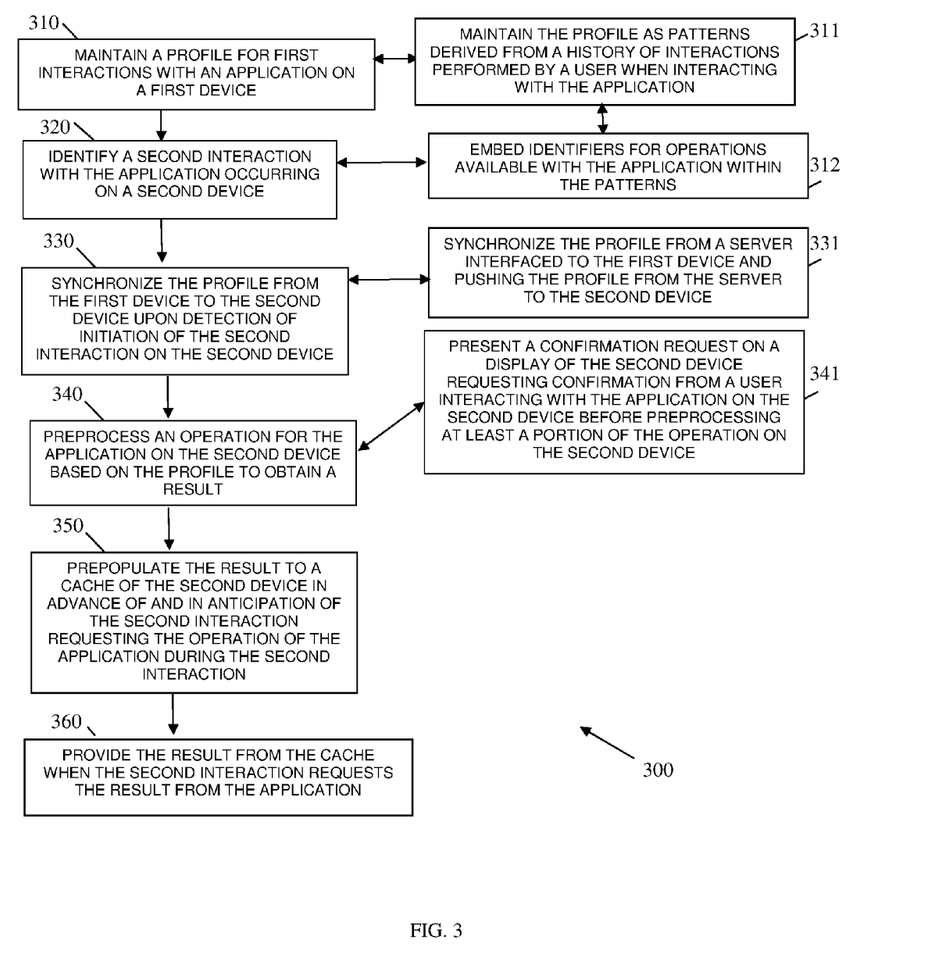
FIG. 3 is a diagram of another method for predictive memory caching, according to an example embodiment.

FIG. 3 is a diagram of another method 200 for predictive memory caching, according to an example embodiment. The software module(s) that implements the method 200 is referred to as a "predictive action service." The predictive action service is implemented as executable instructions programmed and residing within memory and/or a non-transitory computer-readable (processor-readable) storage medium and executed by one or more hardware processors of a hardware device. The processors of the device that executes the predictive action service are specifically configured and programmed to process the predictive action service. The predictive action service has access to one or more networks during its processing. The networks can be wired, wireless, or a combination of wired and wireless.

In an embodiment, the device that executes the predictive action service is a server 110.

In an embodiment, the device that executes the predictive action service is device #1 120 or device #2 130. In an embodiment, the device 120 or 130 is one of: a phone, a wearable processing device, a tablet, a laptop, a Self-Service Terminal (SST), a Point-Of-Sale (POS) terminal, and a desktop computer.

In an embodiment, the predictive action service is the predictive manager 114, 124, or 134.

In an embodiment, the predictive actions service is an enhanced version of the predictive cache manager described above with the FIG. 2, with the predictive action service providing at least one different and enhanced mode of operation from that which the predictive cache manager provides.

At 310, the predictive action service maintains a profile for first interactions with an application on a first device. In an embodiment, the profile includes the information and structure described above with reference to the FIG. 1.

In an embodiment, at 311, the predictive action service maintains the profile as patterns derived from a history of interactions (sessions) performed by a user when interacting with the application.

In an embodiment of 311 and at 312, the predictive action service embeds identifiers for operations available with the application within the patterns.

At 320, the predictive action service identifies a second interaction with the application occurring on a second device.

At 330, the predictive action service synchronizes the profile from the first device to the second device upon detection of initiation of the second interaction on the second device.

According to an embodiment, at 331, the predictive action service synchronizes the profile from a server interfaced to the first device and the predictive action service pushes the profile from the server to the second device.

In an embodiment, the processing 310-330 represents the third mode of operation for the system 100 of the FIG. 1.

At 340, the predictive action service preprocesses an operation for the application on the second device based on the profile to obtain a result, this is done in advance of the second interaction requesting that the operation be processed by application.

In an embodiment of 331 and 340, at 341, the predictive action service presents a confirmation request on a display of the second device requesting confirmation from a user interacting with the application on the second device before preprocessing at least a portion of the operation on the second device. This processing represents the fourth mode of operation for the system 100 of the FIG. 1.

At 350, the predictive action service prepopulates the result to a cache of the second device in advance of and in anticipation of the second interaction requesting the operation of the application during the second interaction.

According to an embodiment, at 360, the predictive action service provides the result from the cache when the second interaction requests the result from the application.

Figure 4:
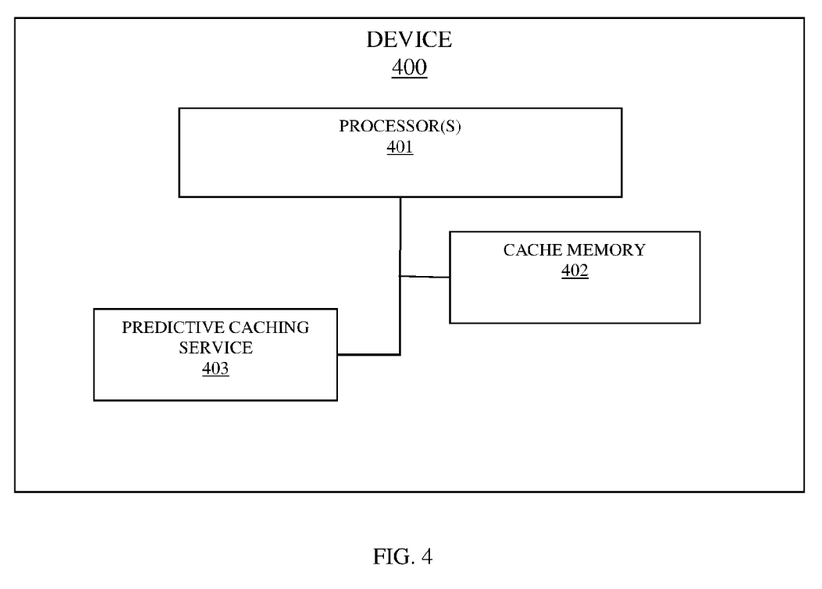
FIG. 4 is a diagram of a device for predictive memory caching, according to an example embodiment.

FIG. 4 is a diagram of a device for predictive memory caching, according to an example embodiment. The device 400 includes a variety of hardware components and software components. The software components of the device 400 are programmed and reside within memory and/or a non-transitory computer-readable medium and execute on one or more hardware processors of the hardware device 400. The device 400 may or may not communicate over one or more networks; any such networks can be wired, wireless, or a combination of wired and wireless.

In an embodiment, the device 400 implements all, any, or some combination of the processing discussed above with the FIGS. 1-3.

The device 400 includes at least one hardware processor 401, cache memory 402, and a predictive caching service 403.

In an embodiment, the device 400 is the server 110.

In an embodiment, the device 400 is the device 110 or 120. In an embodiment, the device 400 is one of: a phone, a tablet, a wearable processing device, a laptop, a desktop computer, a Self-Service Terminal (SST), or a Point-Of-Sale (POS) terminal.

The predictive caching service 403 is configured to: execute on the processor 401; preprocess an operation for an application in advance of a request made by a user interacting with the application based on a behavioral profile of the user for prior operations taken by the user during prior interactions of the user with the application; prepopulate the cache memory 402 with a result obtained from preprocessing the operation in advance of a request made by the user for the application to process the operation; and provide the result from the cache memory 402 when the user makes the request for the application to process the operation.

In an embodiment, the behavior profile is created, maintained, and processed as the metadata history 113A, 123B, and 133B discussed above with the FIGS. 1-3.

In an embodiment, the predictive caching service 403 is further configured to: preprocess at least one additional operation to resolve a variable value for a variable associated with a template for a confirmation request, replace the variable with the resolved variable value, and present the template as the confirmation request for confirmation by user before preprocessing the operation. In an embodiment, this configuration of the predictive cache service is the fourth mode of operation for the system 100.

In an embodiment, the predictive caching service 403 is the predictive manager 114, 124, or 134.

In an embodiment, the predictive caching service 403 is the method 200 or the method 300.

In an embodiment, the predictive caching service 403 is a combination or all or some of: the predictive manager 114, 124, 134; the method 200; and the method 300.

In an embodiment, the predictive caching service 403 is a wrapper to the application.

In an embodiment, the predictive caching service 403 is a transparent proxy to the application.

In an embodiment, the predictive caching service 403 is integrated as an enhancement within the application.

In an embodiment, the predictive caching service 403 is registered to an OS of the device 400 for receiving calls made to and information sent from the application during execution of the application.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    collecting metadata for an interaction with an application;
    matching the metadata with a pattern in metadata history for previous interactions with the application, including scoring weighted components of the metadata and comparing the scored and weighted components against scored and weighted patterns in the metadata history for matching to the pattern;
    executing an operation identified in the pattern to obtain a result; and
    prepopulating a cache with the result in advance of the interaction requesting that the operation be processed by the application.

2. The method of claim 1 further comprising, providing the result from the cache when the interaction requests the operation for processing by the application.

3. The method of claim 1, wherein collecting further includes collecting the metadata as session metadata for a network session between the application and a network application, wherein the network session is the interaction.

4. The method of claim 1, wherein collecting further includes collecting the metadata as session metadata for a session initiated when a user operating the device initiates the application on the device for execution, wherein the session is between the user and the application and contained on the device.

5. The method of claim 1, wherein matching further includes processing a machine learning algorithm for matching to the pattern.

6. The method of claim 5, wherein processing further dynamically adjusting a factor processed by the machine learning algorithm in performing matching based on one or more actions taken during the interaction for processing by the machine learning algorithm in subsequent interactions with the application.

7. The method of claim 1, wherein executing further includes executing the operation as a series of operations associated with a workflow.

8. The method of claim 7, wherein executing further includes processing at least one of the operations from the series by a different application from the application.

9. The method of claim 1, wherein executing further includes executing the operation as a background process on the device.

10. The method of claim 1, wherein prepopulating further includes streaming the results over a network connection as a background process to the cache, wherein the cache is part of the device.

11. A method, comprising:
    maintaining a profile for first interactions with an application on a first device;
    identifying a second interaction with the application occurring on a second device;
    synchronizing the profile from the first device to the second device upon detection of initiation of the second interaction on the second device;
    preprocessing an operation for the application on the second device based on the profile to obtain a result and presenting a confirmation request on a display of the second device requesting confirmation from a user interacting with the application on the second device before preprocessing at least a portion of the operation on the second device; and
    prepopulating the result to a cache of the second device in advance of and in anticipation of the second interaction requesting the operation of the application during the second interaction.

12. The method of claim 11 further comprising, providing the result from the cache when the second interaction requests the result from the application.

13. The method of claim 12, wherein maintaining further includes maintaining the profile as patterns derived from a history of interactions performed by a user when interacting with the application.

14. The method of claim 13, wherein maintaining further includes embedding identifiers for operations available with the application within the patterns.

15. The method of claim 11, wherein synchronizing further includes synchronizing the profile from a server interfaced to the first device and pushing the profile from the server to the second device.

16. A device, comprising:
    a hardware processor;
    a cache memory;
    a predictive caching service configured to: i) execute on the hardware processor, ii) preprocess an operation for an application in advance of a request made by a user interacting with the application based on a behavioral profile of the user for prior operations taken by the user during prior interactions of the user with the application, iii) prepopulate the cache memory with a result obtained from preprocessing the operation in advance of a request made by the user for the application to process the operation and preprocess at least one additional operation to resolve a variable value for a variable associated with a template for a confirmation request, replace the variable with the resolved variable value, and present the template as the confirmation request for confirmation by the user before preprocessing the operation, and iv) provide the result from the cache memory when the user makes the request for the application to process the operation.

17. The device of claim 16, wherein the device is one of: a phone, a wearable processing device, a tablet, a laptop, a desktop computer, a Self-Service Terminal, and a POS terminal.

\* \* \* \* \*